(12) United States Patent
McDonald

(10) Patent No.: US 12,042,886 B2
(45) Date of Patent: Jul. 23, 2024

(54) DEVICES AND METHODS TO FACILITATE WELDING OF PIPE SECTIONS

(71) Applicant: Universal D-Mag Enterprises, LLC, Lexington, KY (US)

(72) Inventor: Earl McDonald, Georgetown, KY (US)

(73) Assignee: Universal D-Mag Enterprises, LLC, Lexington, KY (US)

( * ) Notice: Subject to any disclaimer, the term of this patent is extended or adjusted under 35 U.S.C. 154(b) by 430 days.

(21) Appl. No.: 17/197,610

(22) Filed: Mar. 10, 2021

(65) Prior Publication Data
US 2021/0283703 A1  Sep. 16, 2021

Related U.S. Application Data

(60) Provisional application No. 62/988,348, filed on Mar. 11, 2020.

(51) Int. Cl.
*B23K 9/08* (2006.01)

(52) U.S. Cl.
CPC ..................... *B23K 9/08* (2013.01)

(58) Field of Classification Search
CPC .......... B23K 9/08; B23K 9/09; B23K 9/1087; B23K 9/235; B23K 9/00
USPC ................................................ 361/143, 144
See application file for complete search history.

(56) References Cited

U.S. PATENT DOCUMENTS

| 2,472,851 A | 6/1949 | Landis et al. |
| 4,761,536 A | 8/1988 | Blakeley |
| 4,873,605 A | 10/1989 | Drits et al. |
| 5,345,058 A | 9/1994 | Jones et al. |
| 10,173,279 B2 | 7/2019 | Henry et al. |
| 2009/0072937 A1 | 3/2009 | Holley |
| 2011/0100981 A1 | 5/2011 | Lim |
| 2011/0159192 A1* | 6/2011 | Daykin ............... B05B 13/0478 427/314 |
| 2013/0056454 A1 | 3/2013 | Foulds et al. |
| 2013/0341320 A1* | 12/2013 | Tailor .................. F16L 13/0272 219/674 |
| 2014/0151368 A1* | 6/2014 | Morrison ................. H05B 6/36 219/676 |

FOREIGN PATENT DOCUMENTS

GB            2158758            11/1985

* cited by examiner

*Primary Examiner* — Danny Nguyen
(74) *Attorney, Agent, or Firm* — Trevor T. Graves; Stites & Harbison PLLC

(57) ABSTRACT

According to some embodiments, a device for reducing magnetic force along a section of piping comprises a first end member comprising an opening, a second end member comprising an opening, at least one connecting member extending between the first end member and the second end member, the at least one connecting member secured to both the first and second end members, wherein the at least one connecting member defines a passageway that generally aligns with the openings of the first and second end members, and wherein the passageway and the central openings of the first and second members are sized and otherwise configured to accommodate a pipe section. The device further includes a coil configured to conduct electrical current.

18 Claims, 9 Drawing Sheets

DEVICES AND METHODS TO FACILITATE WELDING OF PIPE SECTIONS

CROSS-REFERENCE TO RELATED APPLICATIONS

This application claims priority to U.S. Provisional Application No. 62/988,348, filed Mar. 11, 2020, the contents of which are incorporated herein by reference in their entirety.

BACKGROUND

Field

This application relates generally to technologies for regulating magnetic forces, and more specifically, to devices, systems and methods of reducing magnetic forces along sections of pipe, other hollow members or other members being welded.

Description of the Related Art

Arc blow is a common problem associated with welding of certain pipe sections (e.g., high pressure steel pipes, other pipes used in the oil and gas industry, etc.). The magnetism that results in such pipe sections can result in time delays, production inefficiencies, defects in the resulting welds and other disadvantages. Accordingly, reduction of residual magnetism in pipe sections is beneficial and oftentimes necessary prior to welding.

SUMMARY

According to some embodiments, a device for reducing magnetic force along a section of piping comprises a first end member comprising an opening (e.g., a central opening), a second end member comprising an opening (e.g., a central opening), at least one connecting member (e.g., strut, other member, etc.) extending between the first end member and the second end member, the at least one connecting member secured to both the first and second end members, wherein the at least one connecting member defines a passageway that generally aligns with the openings (e.g., central openings) of the first and second end members, and wherein the passageway and the central openings of the first and second members are sized and otherwise configured to accommodate a pipe section. The device further includes a coil configured to conduct electrical current; wherein the coil is positioned in a helical arrangement around the passageway along the at least connecting member, wherein the device is configured to be moved between a closed configuration and an open configuration, wherein in the closed configuration the coil is configured to surround piping, and wherein the device can be positioned over and removed from piping in the open configuration, and wherein the coil is configured to couple to an electrical energy source for selectively delivering electrical current to the coil.

According to some embodiments, each of the first and second end members comprises a first section and a second section, wherein the first section is configured to move relative to the second section in order to move the device between the closed and open configurations, wherein the first and second sections are configured to move relative to the at least one movable connection point, wherein each of the first and second end members comprises a polygonal shape, and wherein the coil comprises a first end and a second end, wherein the first and second ends of the coil are configured to be located adjacent the same end member.

According to some embodiments, the first and second sections are configured to move relative to the at least one movable connection point. In some embodiments, the at least one movable connection point comprises a hinge or a pivot. In some embodiments, each of the first and second sections comprise half or substantially half of the corresponding end member.

According to some embodiments, at least one of the first and second end members comprises a polygonal shape (e.g., octagonal, hexagonal, other polygonal, etc.). In some embodiments, at least one of the first and second end members comprises a round, circular and/or curved shape.

According to some embodiments, the coil comprises at least one coil coupling, the at least one coil coupling being configured to removably couple adjacent portions of the coil, wherein the at least one coil coupling permits the coil to remain secured to the at least one connecting member when the device is in the closed and open orientations.

According to some embodiments, the at least one coil coupling comprises a first coil coupling and at least a second coil coupling, wherein the first coil coupling and the at least second coil coupling are configured radially align relative to a longitudinal axis of the passageway and the device.

According to some embodiments, the coil comprises a first end and a second end, wherein the first and second ends of the coil are configured to be located adjacent the same end member.

According to some embodiments, the device is configured to remove or otherwise eliminate 70% to 100% (e.g., 70%-100%, 70%-95%, 70%-90%, 70%-85%, 70%-80%, 70%-75%, 75%-100%, 75%-95%, 75%-90%, 75%-85%, 75%-80%, 80%-100%, 80%-95%, 80%-90%, 80%-85%, 85%-100%, 85%-95%, 85%-90%, 90%-100%, 90%-95%, at least 70%, at least 75%, at least 80%, at least 85%, at least 90%, at least 95%, at least 96%, at least 97%, at least 98%, at least 99%, percentages between the foregoing values and ranges, etc.) of the magnetic field and/or other magnetically-induced forces at or near the targeted area of a weld.

According to some embodiments, a device for reducing magnetic force along a section of piping comprises a first end member, a second end member, at least one connecting member extending between the first end member and the second end member, the at least one connecting member secured to both the first and second end members, wherein a passageway extending through the first end member, the second member and the at least one connecting member is configured to accommodate a pipe section, and a coil configured to conduct electrical current; wherein the coil is positioned around the passageway along the at least connecting member, wherein the device is configured to be moved between a closed configuration and an open configuration, wherein in the closed configuration the coil is configured to surround piping, and wherein the device can be positioned over and removed from piping in the open configuration, and wherein the coil is configured to couple to an electrical energy source for selectively delivering electrical current to the coil.

According to some embodiments, each of the first and second end members comprises a first section and a second section, wherein the first section is configured to move relative to the second section in order to move the device between the closed and open configurations, wherein the first and second sections are configured to move relative to the at least one movable connection point, wherein each of the first and second end members comprises a polygonal shape, and wherein the coil comprises a first end and a second end, wherein the first and second ends of the coil are configured to be located adjacent the same end member.

According to some embodiments, the first and second sections are configured to move relative to the at least one movable connection point. In some embodiments, the at least one movable connection point comprises a hinge or a pivot.

According to some embodiments, at least one of the first and second sections comprises half or substantially half of the corresponding end member. In some embodiments, at least one of the first and second end members comprises a polygonal shape.

According to some embodiments, the coil comprises at least one coil coupling, the at least one coil coupling configured to removably couple adjacent portions of the coil, wherein the at least one coil coupling permits the coil to remain secured to the at least one connecting member when the device is in the closed and open orientations. In some embodiments, the at least one coil coupling comprise a first coil coupling and at least a second coil coupling, wherein the first coil coupling and the at least second coil coupling are configured radially align relative to a longitudinal axis of the passageway and the device.

According to some embodiments, the coil comprises a first end and a second end, wherein the first and second ends of the coil are configured to be located adjacent the same end member.

According to some embodiments, the device is configured to remove or otherwise eliminate 70% to 100% (e.g., 70%-100%, 70%-95%, 70%-90%, 70%-85%, 70%-80%, 70%-75%, 75%-100%, 75%-95%, 75%-90%, 75%-85%, 75%-80%, 80%-100%, 80%-95%, 80%-90%, 80%-85%, 85%-100%, 85%-95%, 85%-90%, 90%-100%, 90%-95%, at least 70%, at least 75%, at least 80%, at least 85%, at least 90%, at least 95%, at least 96%, at least 97%, at least 98%, at least 99%, percentages between the foregoing values and ranges, etc.) of the magnetic field and/or other magnetically-induced forces at or near the targeted area of a weld.

According to some embodiments, a system comprises a device according to any of the embodiments disclosed herein (e.g., a device as described by any of the preceding paragraphs) and a generator or other electrical energy source. In some embodiments, the generator is provided with the device. In some embodiments, the generator is provided separately from the device (e.g., supplied by a different supplier or manufacturer, an off-the-shelf item, etc.).

According to some embodiments, a device for reducing magnetic force along a section of piping comprises a first end member comprising a central opening, a second end member comprising a central opening, at least one connecting member extending between the first end member and the second end member, the at least one connecting member secured to both the first and second end members; wherein the at least one connecting member defines a passageway that generally aligns with the central openings of the first and second end members, and wherein the passageway and the central openings of the first and second members are sized and otherwise configured to accommodate a pipe section, and a coil configured to conduct electrical current; wherein the coil is positioned in a helical arrangement around the passageway along the at least one connecting member, wherein the device is configured to be moved between a closed configuration and an open configuration, wherein in the closed configuration the coil is configured to surround piping, and wherein the device can be positioned over and removed from piping in the open configuration, and wherein the coil is configured to couple to an electrical energy source for selectively delivering electrical current to the coil.

According to some embodiments, each of the first and second end members comprises a first section and a second section, wherein the first section is configured to move relative to the second section in order to move the device between the closed and open configurations. In some arrangements, the first and second sections are configured to move relative to at least one movable connection point (e.g., a hinge, a pivot, joint, etc.).

According to some embodiments, each of the first and second sections comprise half or substantially half of the corresponding end member.

According to some embodiments, each of the first and second end members comprises a polygonal shape (e.g., octagonal, hexagonal, rectangular, etc.). In some embodiments, each of the first and second end members comprises a round or circular shape (e.g., circular, oval, other shapes having one or more curved portions, etc.).

According to some embodiments, the coil comprises at least one coil coupling, the at least one coil coupling configured to removably couple adjacent portions of the coil, wherein the at least one coil coupling permits the coil to remain secured to the at least one connecting member when the device is in the closed and open orientations.

According to some embodiments, the at least one coil coupling comprise a first coil coupling and at least a second coil coupling, wherein the first coil coupling and the at least second coil coupling are configured radially align relative to a longitudinal axis of the passageway and the device.

According to some embodiments, the coil comprises a first end and a second end, wherein the first and second ends of the coil are configured to be located adjacent the same end member. In some embodiments, the coil is secured to the at least one connecting member using at least one fastener (e.g., a zip tie, another mechanical fastener, etc.).

According to some embodiments, the passageway defined by the at least one connecting member and the central openings are circular or substantially circular.

According to some embodiments, the first and second end members and the at least one interconnecting member comprise a rigid structure. In some embodiments, the first and second end members and the at least one interconnecting member comprise at least one metal or alloy (e.g., carbon steel, stainless steel, iron, etc.).

According to some embodiments, a system for reducing magnetic force along a section of piping comprises a device according to any one of the embodiments disclosed herein, and an electrical energy source for selectively delivering electrical current to the coil of the device. In some embodiments, the electrical energy source comprises a DC generator or an AC generator.

BRIEF DESCRIPTION OF THE DRAWINGS

These and other features, aspects and advantages of the present application are described with reference to drawings of certain embodiments, which are intended to illustrate, but not to limit, the present disclosure. It is to be understood that the attached drawings are for the purpose of illustrating concepts disclosed in the present application and may not be to scale.

DETAILED DESCRIPTION

According to some embodiments, various devices, systems and methods for mitigating (e.g., lowering, reducing, eliminating, reversing, etc.) magnetic force disclosed herein are configured to be placed around one or more sections of pipe (and/or any other items or portions) being welded. Such devices, systems and methods can advantageously reduce or negate or otherwise counter, completely or partially, magnetic fields in the area of pipe to be welded. By way of example, the devices, systems and/or methods disclosed herein can be configured to remove or otherwise eliminate 70% to 100% (e.g., 70% 400%, 70%-95%, 70%-90%, 70%-85%, 70%-80%, 70%-75%, 75%-100%, 75%-95%, 75%-90%, 75%-85%, 75%-80%, 80%-100%, 80%-95%, 80%-90%, 80%-85%, 85%-100%, 85%-95%, 85%-90%, 90%-100%, 90%-95%, at least 70%, at least 75%, at least 80%, at least 85%, at least 90%, at least 95%, at least 96%, at least 97%, at least 98%, at least 99%, percentages between the foregoing values and ranges, etc.) of the magnetic field and/or other magnetically-induced forces at or near the targeted area of the weld. Once at least partial demagnetization has been accomplished, the welding of pipe can be performed in a more timely, efficient and successful manner. Although the various demagnetization technologies disclosed herein are discussed in the context of welding of pipes, such embodiments may also be applicable to other technologies or industries where demagnetization is desired or necessary, such as, for example, construction, automotive or other transportation, shipping and/or the like.

The various embodiments of a device configured to eliminate or otherwise reduce magnetic forces along a piping system disclosed herein can provide one or more benefits and advantages (e.g., vis-à-vis prior technologies). For example, the demagnetization devices discussed in the present application can facilitate the welding of piping sections that have been difficult or impossible to reach with prior devices and technologies. As discussed in greater detail below, various embodiments of demagnetization devices disclosed herein can be configured to strategically surround (e.g., fully or partially) targeted piping sections by opening and closing around said piping sections. This can provide enhanced (e.g., greater) flexibility to users to tactically position a demagnetization device along specific portions of piping being welded. Relatedly, the devices disclosed herein can be easily removed from one targeted piping portion or location and easily and quickly moved to subsequent portions or locations, as needed or required. Accordingly, not only can selected pipe portions be reached and prepared for welding procedures, but the welding time can be reduced by allowing the various technologies described herein to be easily moved to other locations where welding is needed.

Figure 1:
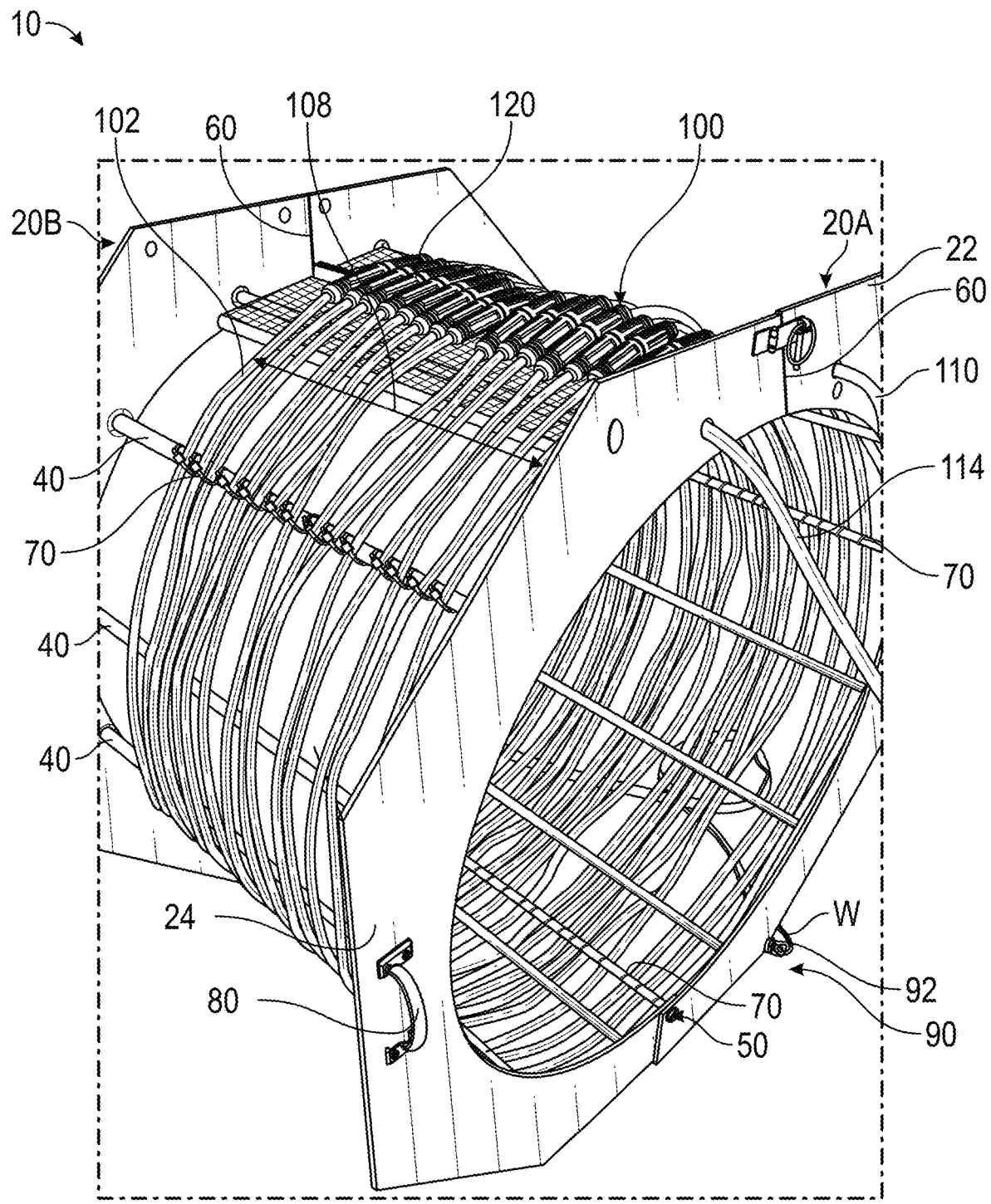
FIG. 1 illustrates a side perspective view of a device configured to reduce magnetization for use in the welding of pipe sections according to one embodiment.
Figure 2:
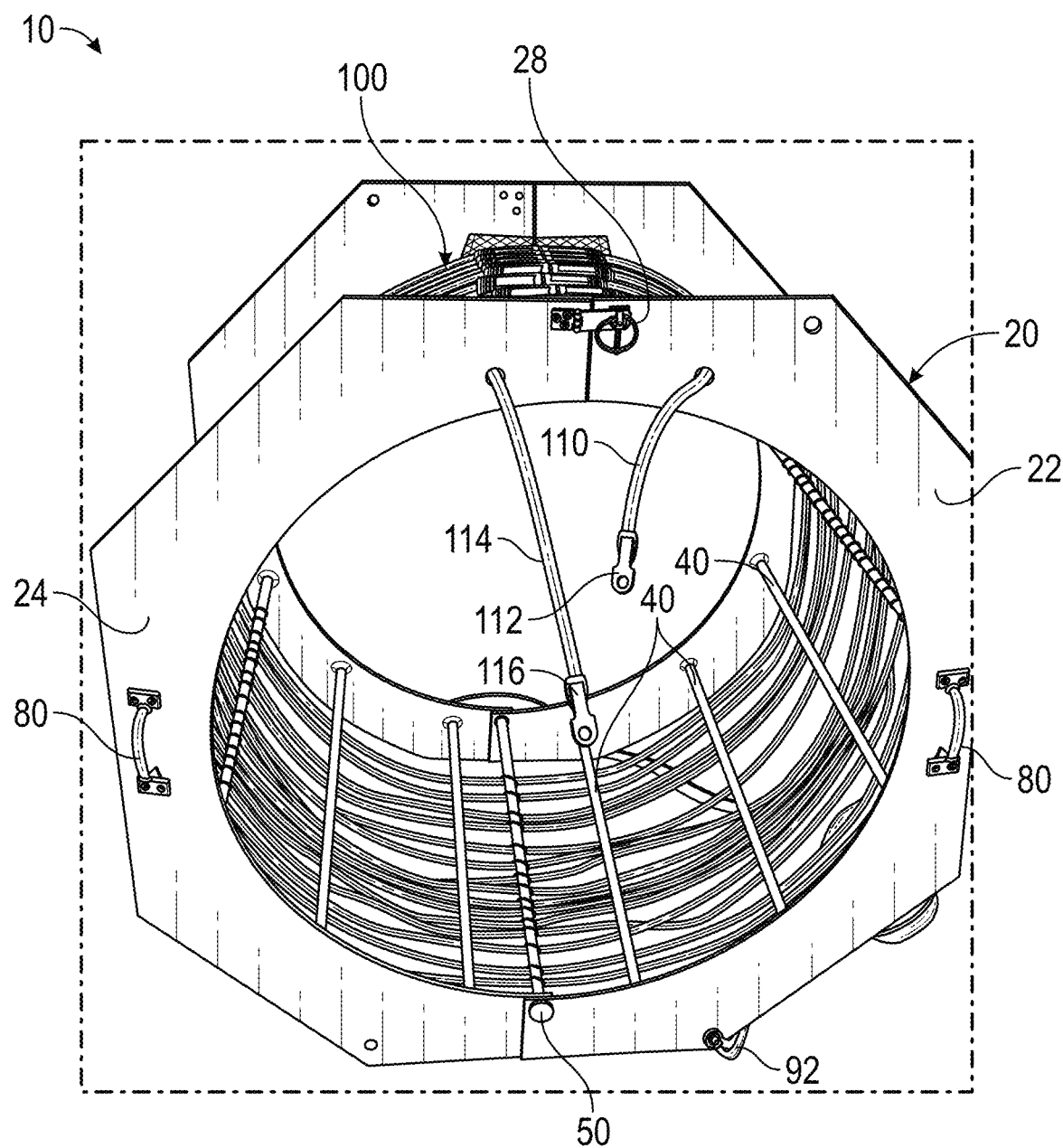
FIG. 2 illustrates a front perspective view of the device of FIG. 1.

FIGS. 1 and 2 illustrate different perspective views of one embodiment of a device 10 configured to be placed around one or more sections of pipe to eliminate or reduce magnetic forces. Magnetic forces can be created within certain pipes as a result of their material, fluids carried through or around such pipes, ambient conditions and/or one or more other factors. For example, magnetic forces are typically generated in steel piping systems used in oil and gas applications and/or similar industries. Thus, when a section of such piping is to be removed or replaced, a tap or other fitting is needed in connection with such a piping system and/or other related piping repair or maintenance is required, it can become very difficult, if not impossible, to weld required portions of such piping. Magnetism in pipes can create problems in the welding process (e.g., due to magnetic arc blow). This may result in poor quality welding and/or additional time and effort in welding.

The depicted device 10 can be strategically positioned and repositioned around sections of piping where welding is required to reduce, completely or partially, magnetic forces present in such piping. After the reduction or elimination of such magnetic forces has occurred (e.g., one or more of the technologies disclosed herein), welding can proceed in a faster, more efficient and overall improved manner.

With continued reference to FIGS. 1 and 2, the demagnetization device 10 can comprise a design that permits the device to be removably positioned around one or more sections of piping. As shown, the device 10 can include a first end member 20A and a second end member 20B. Each of the end members 20A, 20B can include a central opening that is sized, shaped and otherwise configured to surround a section of pipe (not illustrated in FIGS. 1 and 2).

The end members 20A, 20B can be secured to each other using one or more connecting members 40. For example, in the illustrated arrangement, a plurality of struts or other connecting members 40 extend from the first end member 20A to the second end member 20B. In some embodiments, the struts 40 comprise aluminum rods. However, any other type of metal and/or alloy can be used for the struts 40, such as, for example, steel, iron, etc., as desired or required. In some embodiments, the rods or other struts 40 have a diameter or other cross-sectional dimension of 0.75 inches. However, in other arrangements, the diameter or other cross-sectional dimension can be less than 0.75 inches (e.g., 0.1, 0.2, 0.25, 0.3, 0.4, 0.5, 0.6, 0.7 inches, ranges between the foregoing values, etc.) or greater than 0.75 inches (e.g., 0.75, 1, 1.5, 2 inches, greater than 2 inches, ranges between the foregoing values, etc.).

The rods or struts 40 can include a circular cross-section shape. Alternatively, however, the struts 40 can have any other cross-sectional shape, as desired or required, such as, for example, square, rectangular, other polygonal, oval, irregular, etc.

In other arrangements, the struts 40 can include any other material and/or shape, as desired or required. In the illustrated embodiment, the device 10 comprises a total of twelve struts or other members 40 that extend between the two end members 20A, 20B and help couple the members to each other and/or otherwise help reinforce and strengthen the device 10. The struts or other connecting members 40 can be evenly or substantially evenly distributed (e.g., radially) around the central openings of the end members 20A, 20B. The quantity, spacing, orientation and/or any other details can vary.

The struts or other connecting members 40 can be secured to each of the end members 20A, 20B using welds. In other embodiments, the struts 40 are secured to the end members 20A, 20B using one or more other connecting devices, methods or other technologies, such as, for example, nuts and bolts, flanged connections, press or friction fit connections, threaded connections, other mechanical fasteners or connections, adhesives and/or the like. Connections between struts or other connecting members 40 and end members 20A, 20B can be permanent or removable. Further, connections between struts or other connecting members 40 and end members 20A, 20B can be direct or indirect (e.g., using one or more intermediate members or components), as desired or required.

In the illustrated arrangements, each of the end members 20A, 20B comprises an octagonal outer or peripheral shape (e.g., when looking at the end members and the device from the longitudinal end). As shown, in such a configuration, the bottom flat portions of the end members 20A, 20B can be securely positioned along a ground surface (e.g., to help prevent unintended movement of the device 10 during use or storage). In other embodiments, the shape of one or both of the end members 20A, 20B can be different than octagonal, as desired or required. For instance, the shape of one or both of the end members 20A, 20B can be square, other rectangular or quadrangular, pentagonal, octagonal, other polygonal, circular, oval, irregular and/or any other shape. In some embodiments, the device 10 is configured to rest directly on a ground surface. However, in alternative configurations, the device 10 can be configured to be positioned off the ground (e.g., on a cart or another movable or stationary device, another intermediate device or member, etc.).

In the illustrated embodiments, as noted above, the end members 20A, 20B include at least one flat surface to help ensure that the end members and thus the device does not inadvertently roll or otherwise move during a welding procedure. However, in other configurations, one or both of the end members 20A, 20B can include non-flat or non-planar surfaces or portions.

In other embodiments, a device can include additional securement features that help ensure that the end members 20A, 20B and/or other portions of the device 10 remain stationary on an adjacent ground or other surface during use. For example, the end members can include one or more anchors, extensions and/or the like that help prevent relative movement between the device 10 and the ground surface along which the device is positioned. In some arrangements, such anchors, extensions and/or any other components, members or features can be configured to at least partially penetrate the ground surface. In some embodiments, such features are deployable. In other configurations, such features are fixed or immovable.

According to some embodiments, the overall octagonal outer shape of the end members 20A, 20B of the device 10 can assist in moving the device 10 from one location to another. For instance, the device 10 can be rolled along a ground surface to reposition the device for additional demagnetization of piping, transport, storage, etc. Thus, a device 10 having end members with a curved or multi-sided shape can be helpful with such activities. In some embodiments, the end members 20A, 20B can include at least five sides (e.g., at least 5, 6, 7, 8, 9. 10, etc.) in order to assist with making the device 10 easier to move from one location to another (e.g., while still maintaining its ability to remain in place during use).

In other embodiments, the device can be configured to be moved relative to the ground using one or more other techniques, either in addition or in lieu of rolling using a specific end member configuration, as desired or required. For example, the device can include one or more wheels, casters and/or other moving members that facilitate movement of the device to a desired location. Such wheels or other members can be fixed or movable (e.g., retractable). In other embodiments, the device 10 can be configured to be placed on a cart or other moving device to help a user move it to desired locations.

Figure 7:
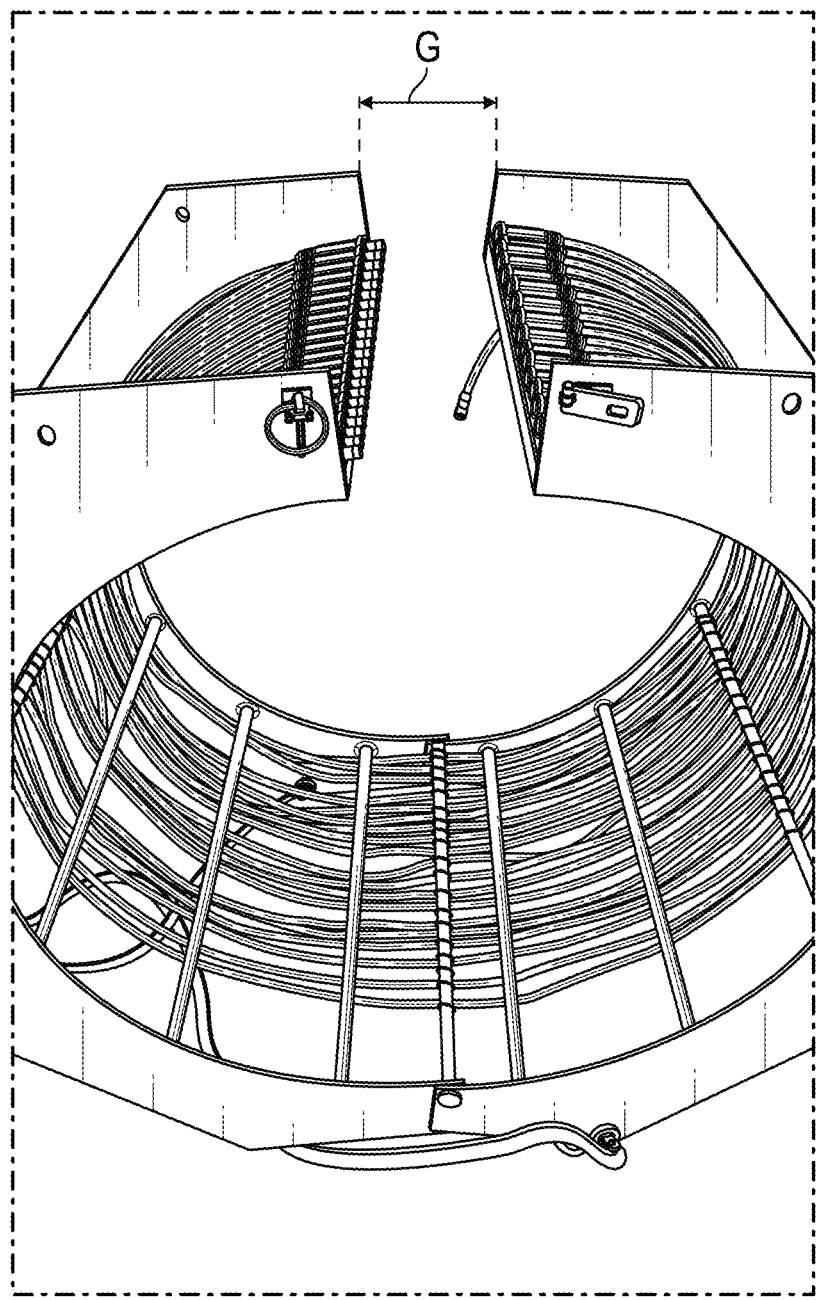
FIGS. 7 and 8 illustrate the device of FIG. 1 in different open or disconnected arrangements.
Figure 8:
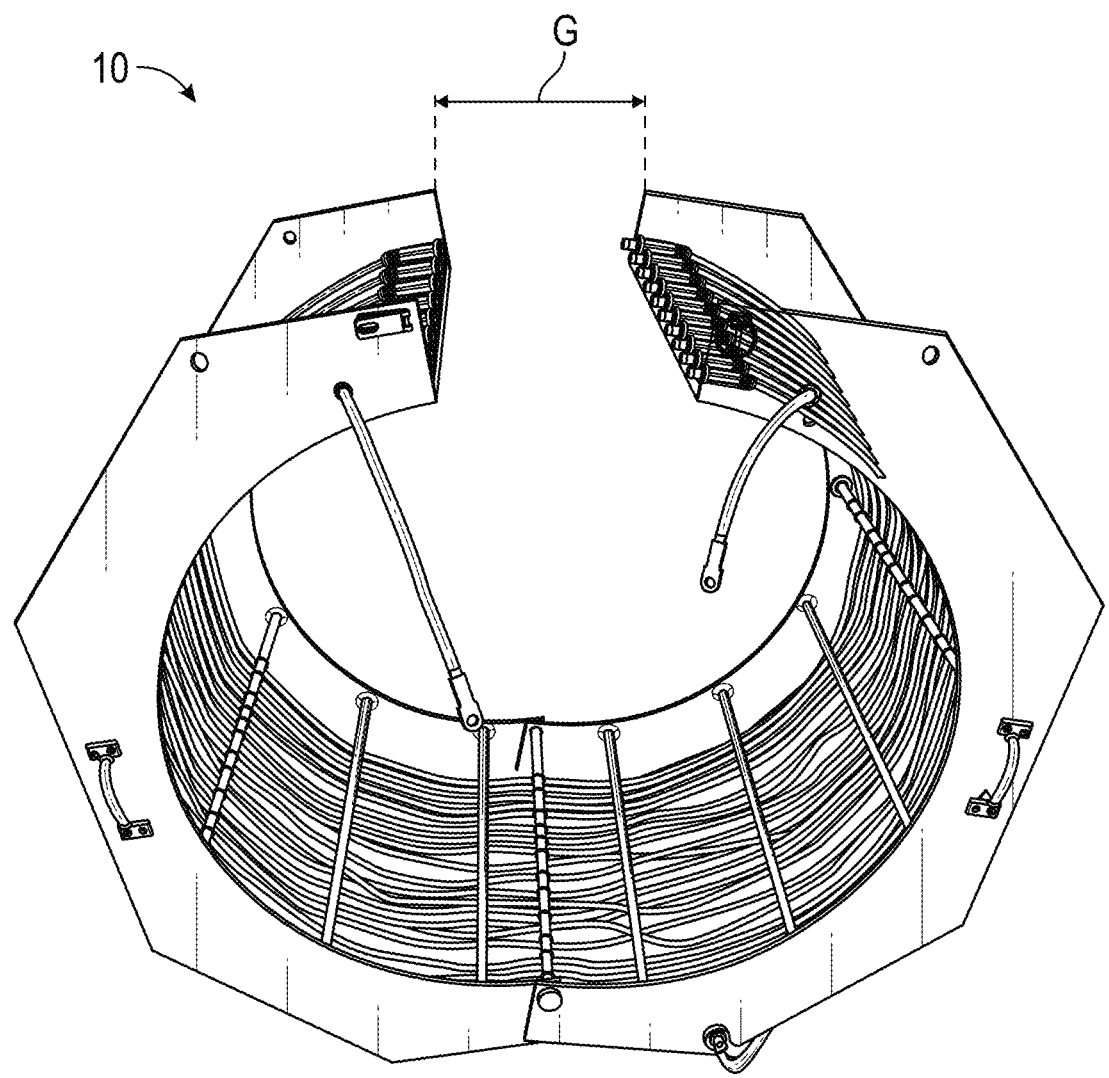

The device 10 can be configured to be selectively moved from a closed position or orientation wherein the device surrounds a pipe section (as shown in FIGS. 1 and 2), and an open position or orientation wherein the device can be moved away from piping (as shown in FIGS. 7 and 8). As a result of such a configuration, and as discussed in greater detail herein, the device 10 and its various components and features can be adapted to permit the device to separate in a manner allowing the device to be positioned around and to be removed from piping sections to be welded, as desired or required.

With continued reference to FIGS. 1 and 2, the demagnetization device 10 can include an electrical coil 100 wrapped around the struts or other connecting members 40. As shown, the coil 100, which is designed and configured to conduct electrical current, can extend (e.g., in a wound orientation about the struts or other connecting members 40) from or near one end member 20A to or near the other end member 20B. In some embodiments, the coil 100 is wound in a sequential or helical fashion. According to some arrangements, the coil 100 is wrapped around the struts or other connecting members 40, and thus the longitudinal axis of the central opening and the overall device, 5 to 50 times (e.g., 5 to 10, 10 to 15, 15 to 20, 20 to 25, 25 to 30, 10 to 20, 10 to 30, 30 to 40, 40 to 50 times, values within the foregoing ranges, etc.). In other embodiments, the coil 100 is wrapped around the struts or other connecting members 40 less than 5 times (e.g., 1, 2, 3, 4 times, values between the foregoing, etc.) or more than 50 times, as desired or required.

In some embodiments, the ends (e.g., terminals) 110, 114 of the coil 100 are configured to be located along the same end of the device 10. For example, in the illustrated embodiment, the ends 110, 114 extend through openings of one of the end members 20A, 20B. As shown, each of the coil ends 110, 114 can include a coupling or other feature 112, 116 to help connect the coil ends to a generator or other electrical power source, either directly or indirectly (e.g., via one or more coils, cables, wires, other electrical connectors, etc.).

Figure 9:
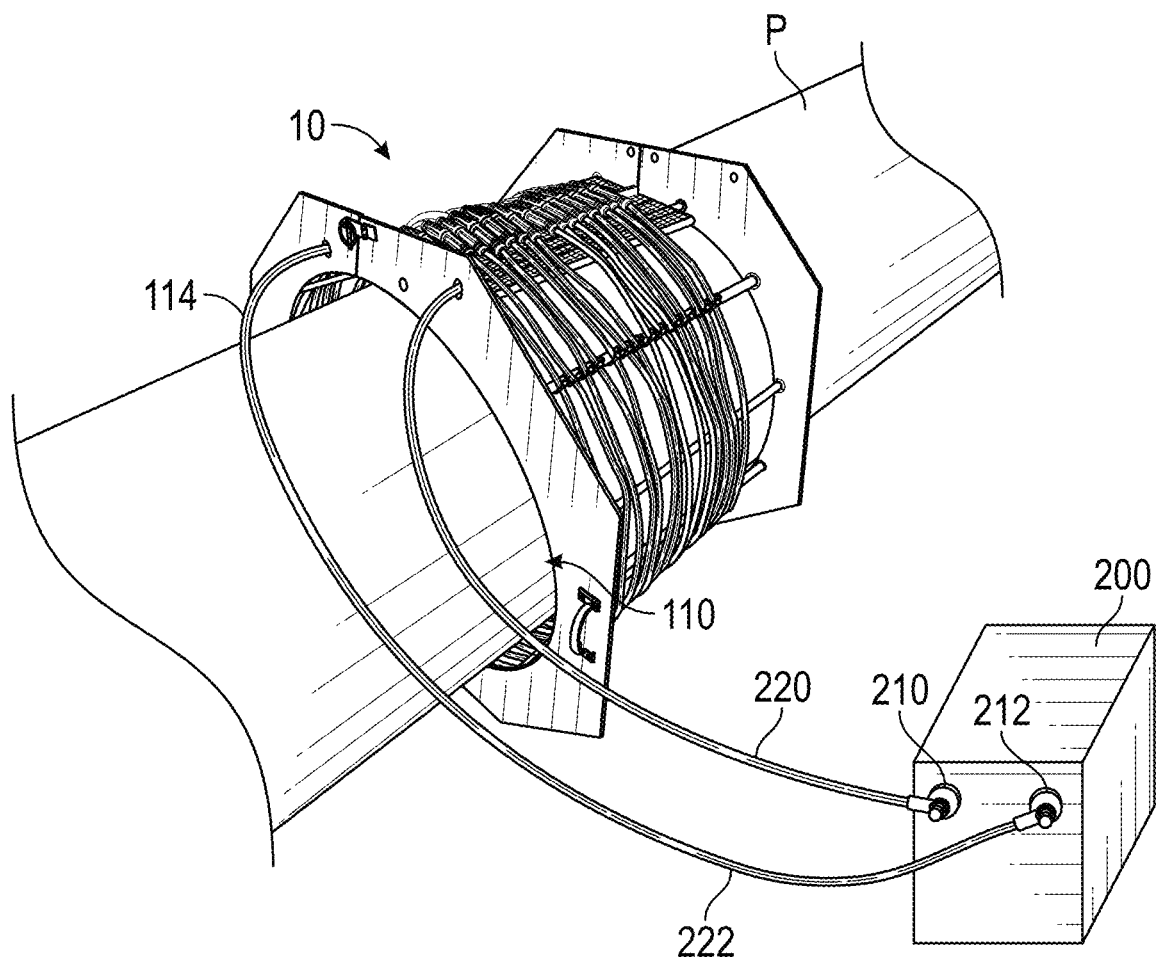
FIG. 9 schematically illustrates an embodiment of a device configured to reduce magnetization situated around pipe sections being welded.

Electrically energizing a coil 100 that is wrapped around a section of piping can help reduce, negate or counter (e.g., completely, substantially completely or at least partially), the magnetic forces that are present along and/or are otherwise acting on the piping. In other words, such energizing can help counter the effects of magnetic arc blow. In some embodiments, as schematically illustrated in FIG. 9, the device 10 can be positioned around a targeted section of piping P and operatively coupled to an electrical generator or other electrical energy source 200. The energy source 200 can be included with the device 10. However, in other embodiments, the device 10 is provided without an energy source 200. In some embodiments, the device can be configured to be used with a standard energy source. For example, the device can include electrical connections, can be rated electrically and/or can include other features to allow it to be used with an off-the-shelf or other standard or non-standard generator or other energy source 200.

With continued reference to FIG. 9, the ends 110, 114 of the coil 100 are coupled to corresponding connectors or couplings 210, 212 of the generator or other electrical energy source 200. As noted above, the ends 110, 114 of the coil 100 can be designed (e.g., with respect to length) to connect directly to the generator 200. However, in other arrangements, the ends 110, 114 are configured to connect to the connectors 210, 212 of the generator using one or more intermediate wires, cables, coils, other electrical coupling devices 220, 222, etc., as desired or required. In some embodiments, one or more other electrical devices or components can be placed electrically between the coil of the device and the generator. Such intermediate electrical devices can be used to regulate the electrical energization of the coil by the generator or other energy source. In some arrangements, such electrical devices can facilitate use of one or more off-the-shelf or other third-party generators or other energy sources with the device.

According to some embodiments, the generator or other energy source 200 can be electrically energized or otherwise activated to selectively deliver an electrical current to the coil 100 surrounding the piping section P. The delivery of electrical current through the coil 100 can advantageously reduce (e.g., completely or partially) magnetic forces present in the piping section P (e.g., present in the piping section as a result of its application or use).

The generator 200 can comprise a DC generator. In alternative embodiments, the generator 200 comprises an AC generator. Any other type of generator 200 can also be used to selectively electrically energize the coil 100 of the device. In some embodiments, the generator or other electrical energy source comprises a Lincoln Electric 225 Welder Generator, Lincoln Electric 300 Welder Generator, Miller Bobcat 250 Welder Generator, Miller Bobcat 300 Welder Generator, etc. However, as noted herein, any other type of generator or energy source can be used, as desired or required.

In some embodiments, the generator is provided together with the device 10 as part of an integrated system. However, in other arrangements, the generator is not provided with the device. The generator can include a customized generator that is specifically designed and configured for use with the device and/or other ancillary components described herein. In other embodiments, however, the generator can be an off-the-shelf or other third party generator that is configured to be used with the device, as desired or required.

In some arrangements, the generator 200 is configured to deliver electrical current to the coil 100 at 100 amps to 300 amps (e.g., 100-300, 100-200, 200-300, 150-250 amps, values between the foregoing ranges, etc.), and 150 to 250 volts (e.g., 220 volts, 200-220, 200-210, 200-230, 200-240, 210-250, 220-250, 230-250, 240-250, 200-250 volts, 150-250 volts, values between the foregoing ranges, etc.). In some embodiments, the coil 100 is configured to be electrically energized for 0 to 30 seconds (e.g., 10 to 30 seconds, 5 to 30 seconds, 10 to 40 seconds, 10 to 50 seconds, 10 to 60 seconds, 10 seconds, 15 seconds, 20 seconds, 25 seconds, 30 seconds, values between the foregoing values and ranges, etc.) prior to ensure that there is sufficient demagnetization of the target piping section.

According to some embodiments, the generator or other electrical energy source 200 can include one or more features that facilitate its movement (e.g., during use in the field, for transportation, for storage, etc.). For example, although not illustrated in the accompanying figures, the generator 200 can include one or more wheels or casters to assist the user in moving the generator 200 from one location to another. In other embodiments, the generator is configured to be placed on a cart or other movable structure or device. In yet other arrangements, one, more or all components of a generator or other electrical energy source 200 can be secured or otherwise incorporated into the device itself.

As noted herein, the device 10 and the generator or other electrical energy source 200 can be provided (e.g., sold, manufactured, supplied, etc.) as a single system or kit. However, in other configurations, the device 10 and the generator 200 are provided to users as separate devices or components.

With continued reference to FIGS. 1 and 2, one or both of the end members 20A, 20B can be configured to be selectively moved between a closed (connected) position and an open (separated) position. As noted herein, such a configuration advantageously permits a user to place the device around targeted sections of piping to perform a desired demagnetization procedure. In some embodiments, such a design allows for the at least partial demagnetization of piping sections that are very difficult and/or impossible (and/or impractical) to at least partially demagnetize using currently available devices and systems. For example, the device 10 can be positioned along a centrally located section of piping which would otherwise be challenging to reach or otherwise access using a fixed demagnetizing device (e.g., one that is not capable of moving between open and closed positions).

Each end member 20A, 20B can include two sections 22, 24 that are connected along the bottom of the corresponding end member 20A, 20B using a hinge, joint or other movable or releasable connection 50. Thus, in such configurations, the sections 22, 24 are able to rotate about the hinge or other movable connection 50 to permit the sections 22, 24 to rotate or otherwise separate or move relative to one another. In some embodiments, the hinge or other movable connection 50 comprises one or more pins or similar systems that extend between the two end members 20A, 20B. In other embodiments, a device 10 can be configured to separate into two or more portions without a hinge or other movable connection. For example, the device can include a modular design where the end members and the related components (e.g., struts or other interconnecting members) can be secured to each other in sections or modules.

Figure 3:
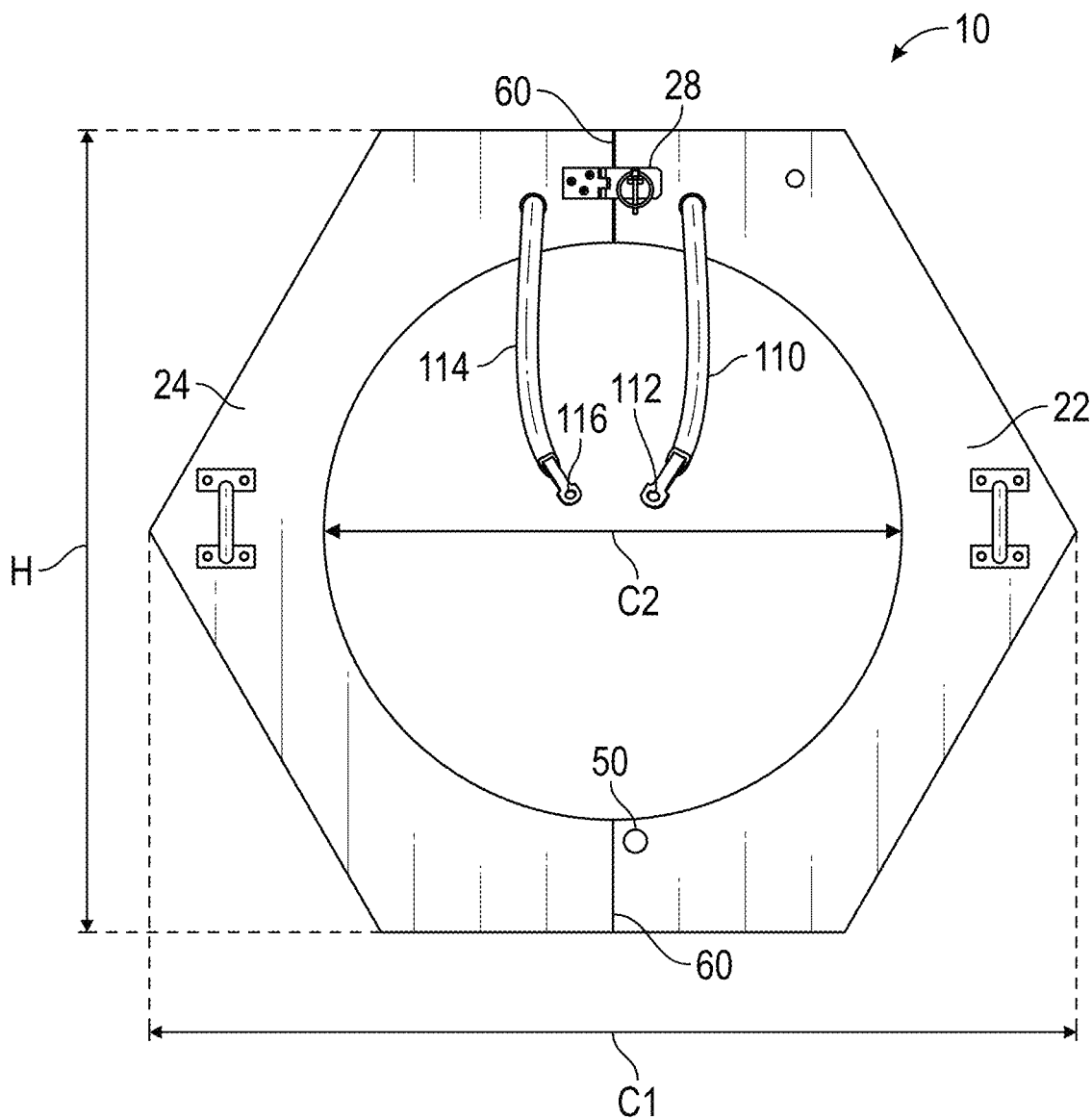
FIG. 3 illustrates a front view of a device configured to reduce magnetization for use in the welding of pipe sections according to another embodiment.
Figure 5:
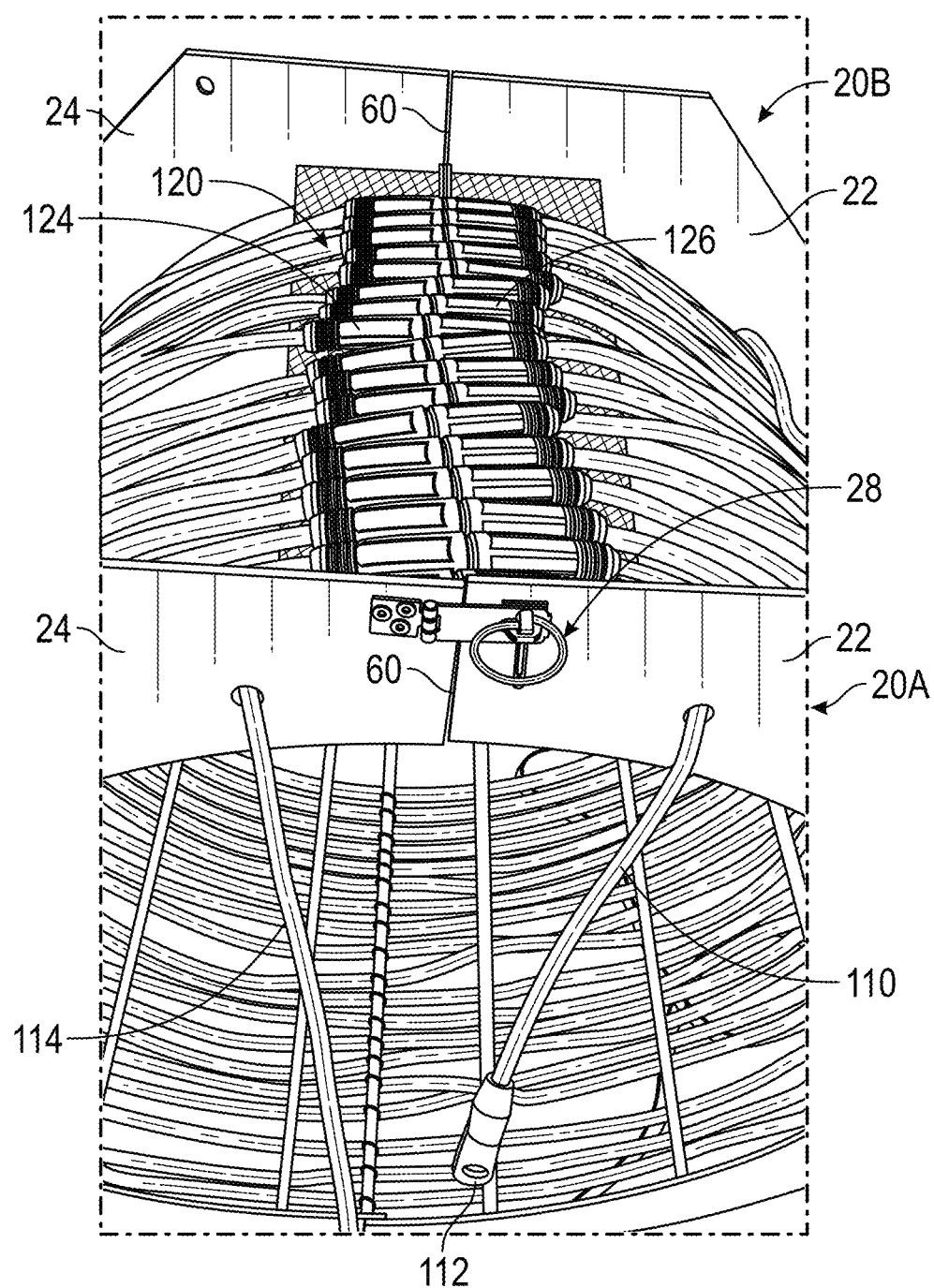
FIG. 5 illustrates another front perspective view of the device of FIG. 1.

As shown in FIGS. 2, 3 and 5, the end members 20A, 20B can include a latch, lock or other securement device or feature 28. Such a securement device or feature 28 can permit the user to maintain the end members 20A, 20B, and thus the device, in a "closed" orientation wherein the sections 22, 24 of each end member 20A, 20B are coupled. In the illustrated embodiment, each end member 20A, 20B comprises only a single securement device or feature 28. However, in other arrangements, an end member 20A, 20B can include two or more (e.g., 2, 3, 4, 5, more than 5, etc.) securement devices or features 28, as desired or required. For example, an end member 20A, 20B can include two, three, four or more sections or portions that are configured to at least partially separate from and connect to each other. Thus, the device can include the necessary securement devices or features 28 to permit a user to assemble and disassemble a device relative to a targeted piping section.

In some embodiments, the device 10 can include one or more components or features to assist with manipulating and moving the device. For example, as shown in the accompanying figures, an end member 20A, 20B of the device 10 can include one or more handles 80, flanges, hooks, openings 84 and/or the like. A user can use such components or features 80, 84 to move and/or otherwise manipulate the device 10 during use, for transport, for storage and/or any other activity.

As illustrated in FIGS. 1, 2, 4 and 5, the cable 100 includes cable couplings 120 along the same location (e.g., radial location). In the depicted embodiment, the cable couplings 120 are strategically located at or near the top of the circle created by the struts or other connecting members 40 of the device 10. The couplings 120 advantageously permit a user to selectively connect and disconnect the cable 100 along each revolution (e.g., along the top of each winding or revolution). Such a configuration can advantageously permit the various sections or portions 22, 24 of the end members 20A, 20B to be moved (e.g., rotated, displaced, etc.) between a closed configuration (where the sections or portions 22, 24 are coupled to one another) and an open configuration (where the sections or portions 22, 24 are de-coupled or separated relative to one another).

As noted above, according to some embodiments, the cable couplings 120 are positioned at or near the top of the circle created by the struts or other connecting members of the device. However, in other arrangements, the cable couplings 120 are positioned at any other location of the circle, to accommodate a particular piping design or other factors (e.g., size of piping system, location of piping system, type of access to piping system, etc.). In some embodiments, the location of the couplings relative to the device can be fixed. Alternatively, however, the location of the couplings can be movable (e.g., to accommodate the requirements and/or needs of the user).

Thus, in some embodiments, in order to place the device 10 in an open configuration, the various cable couplings 120 and any securement devices or features 28 are disconnected to permit a user to "open" the device to create a gap G. The device is configured to separate along a vertical plane 60. However, the device can be configured to separate along any other plane (e.g., angled relative to vertical and/or horizontal). The device 10 is shown in different "open" orientations in FIGS. 7 and 8. In the arrangements illustrated in FIGS. 7 and 8, each of the cable couplings 120 has been disconnected to permit the different sections or portions 22, 24 of the end members 20A, 20B to be rotated about the hinge, pivot or other movable connection 50.

The device 10 can be configured to be strategically moved (e.g., manually by one or more workers, using a crane or other lifting device, etc.) to a targeted section of piping P or other device or member where welding is needed. Once the device 10 has been "opened" sufficiently (e.g., sufficiently to permit placement of the device around a targeted pipe section), the device can be placed around the piping section and rotated or otherwise moved to a closed position (e.g., as shown in FIG. 9). As discussed above, such "opening" can include the separation of the two or more portions of the end members (together with struts, coil and/or other components coupled to the end members), relative to one another (e.g., via rotation around a joint). Once in the closed position or orientation, the cable couplings 120, the securement device or features 28 and/or any other portions of the device 10 can be secured before delivering electrical current to the cable 100 using one or more generators or other electrical energy sources 200. After a targeted piping section has been sufficiently demagnetized and/or the necessary welding procedures have been performed, the device 10 can be moved to an open orientation or position to move the device 10 away from the targeted piping section and to another piping section, for storage or transport and/or any other location, as desired or required.

According to some embodiments, the cable 100 is wrapped around the struts or other connecting members 40 that extend between adjacent end members 20A, 20B in a serial manner. In other words, the cable is positioned along the device in a helical or coiled orientation, such that electrical current flows through each adjacent revolution 102 of the cable. As a result, once a generator is activated, electrical current can move from one end 110 of the cable 100 to the other end 114 in a helical or coiled manner. As illustrated in the side perspective view of FIG. 4, a return portion of the cable 106 extends perpendicularly or substantially perpendicularly from one end of the device (e.g., a location at or near one of the end members 20B) to the opposite end of the device (e.g., a location at or near the other end member 20A). Accordingly, the two ends 110, 114 of the cable 100 are located along the same side of an end member 20A of the device. In some embodiments, in accordance with the illustrated embodiments, the cable ends 110, 114 extend through corresponding openings of the end member 20A.

According to some embodiments, the cable 100 comprises any conductive cable or similar member. In some embodiments, the cable 100 can include an interior conductor that comprises copper, silver, aluminum and/or the like, while the surrounding insulation comprises rubber, thermoplastic and/or the like, as desired or required. The cable 100 can have a gauge of 6 to 4/0 AWG (e.g., 6, 4, 2, 1, 1/0, 2/0, 3/0, 4/0, etc. A cable 100 can include any other material or configuration, as desired or required.

Figure 4:
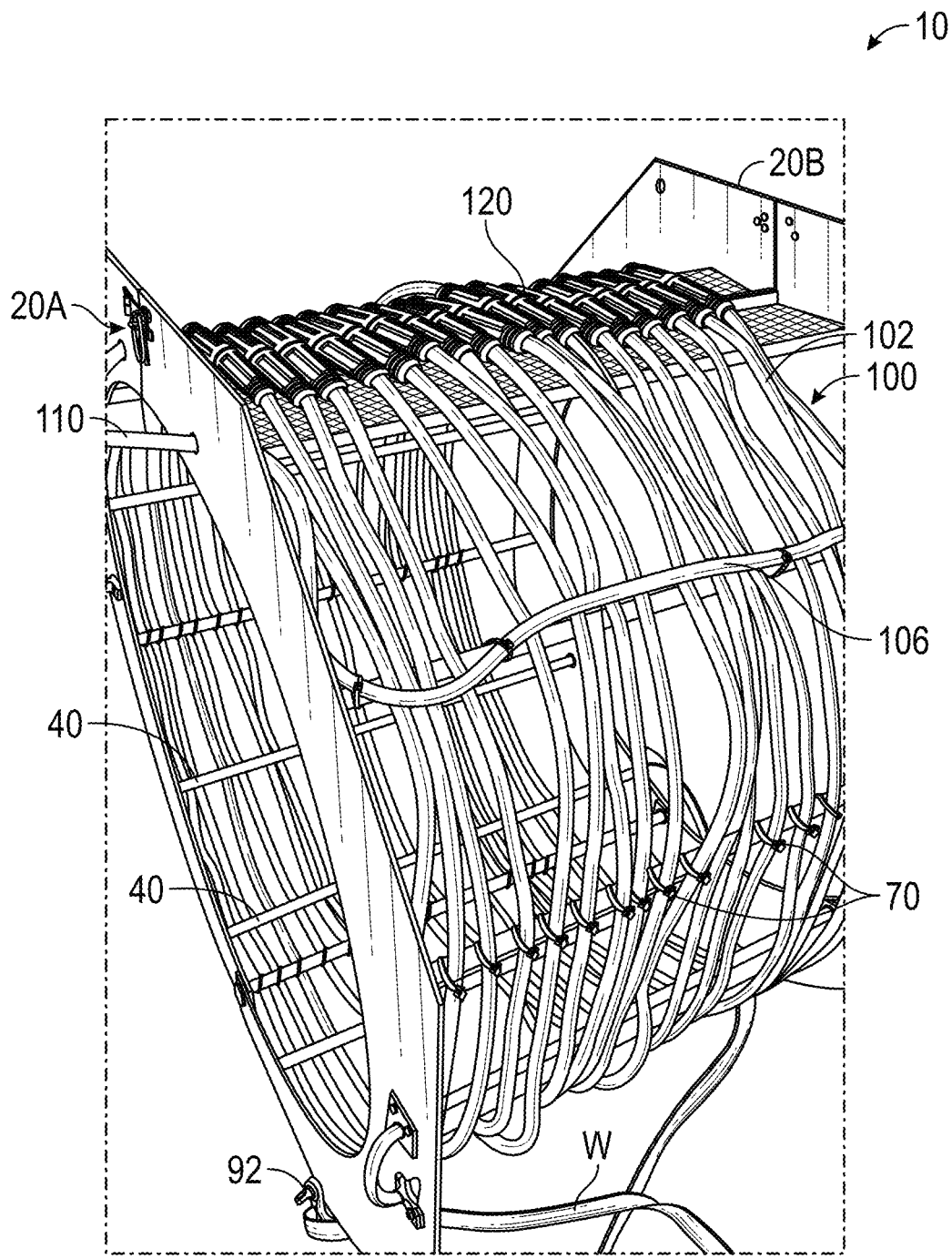
FIG. 4 illustrates another side perspective view of the device of FIG. 1.

According to some embodiments, as illustrated in FIGS. 1 and 4, the device can include one or more straps or other features W. Such straps W can assist with lifting and/or otherwise moving the device 10 (e.g., form one location to another in the field, for transportation, for storage, etc.). In some embodiments, the strap W comprise a nylon and/or other polymeric material that is designed and otherwise configured to withstand the forces and other elements (e.g., weather, sun, friction, shear, other environmental conditions, etc.) to which it may be exposed. As shown, the strap W can connect the end members 20A, 20B to one another. In other embodiments, however, the strop W can include any other material, in addition to or in lieu of polymeric materials such as, for example, metals, alloys and/or the like, as desired or required.

With continued reference to FIGS. 1, 2, 4 and 5, the cable 100 can be secured to the struts or other connecting members 40 of the device 10 using one more fasteners 70. In some embodiments, fasteners 70 comprise zip ties, other mechanical attachment devices or features, adhesives and/or the like. Such components can be temporary (e.g., releasable) or permanent (e.g., not intended to be releasable or movable relative the struts or other portion of the device without being destroyed or otherwise damaged). For example, in some embodiments, the fasteners can include manipulatable hooks or receiving members that selectively allow the cable to secure/couple to and decouple from the struts or other portions of the device.

FIG. 3 schematically illustrates a side or end view of one end member of a demagnetization device 10. In the depicted embodiment, the end members include a hexagonal shape. As noted above, however, the end members can include any other shape (e.g., octagonal as illustrated in other embodiments herein, other polygonal, circular or oval, irregular, etc.).

Regardless of the exact shape of the end members, the overall height H of the end members, and thus the device, can vary depending on the desired central opening through which the targeted piping section will be positioned. In the illustrated embodiment, the height H of the end members is 48 inches, while the diameter or cross-sectional dimension C2 of central opening along the end members and the entire device is 38 inches. In embodiments where the end members have an octagonal shape (e.g., as illustrated in FIG. 1), assuming the diameter or cross-sectional dimension C2 of central opening along the end members and the entire device is 38 inches, the overall cross-sectional (e.g., lateral) dimension C1 of the end members is 48 inches.

The following table summarizes example values of various dimensions of certain device embodiments. However, in other embodiments, a device can include different dimensions than those included in the table.

| Size of Piping to be Welded | C1 | C2 | H |
| --- | --- | --- | --- |
| 24 inch diameter | 38 to 42 inches (e.g., 39-¼ inches) | 24 to 28 inches (e.g., 26 inches) | 32 to 36 inches (e.g., 34 inches) |
| 30 inch diameter | 44 to 48 inches (e.g., 46-3/16 inches) | 30 to 34 inches (e.g., 32 inches) | 38 to 42 inches (e.g., 40 inches) |
| 36 inch diameter | 50 to 56 inches (e.g., 53-⅛ inches) | 36 to 40 inches (e.g., 38 inches) | 44 to 48 inches (e.g., 46 inches) |

Figure 6:
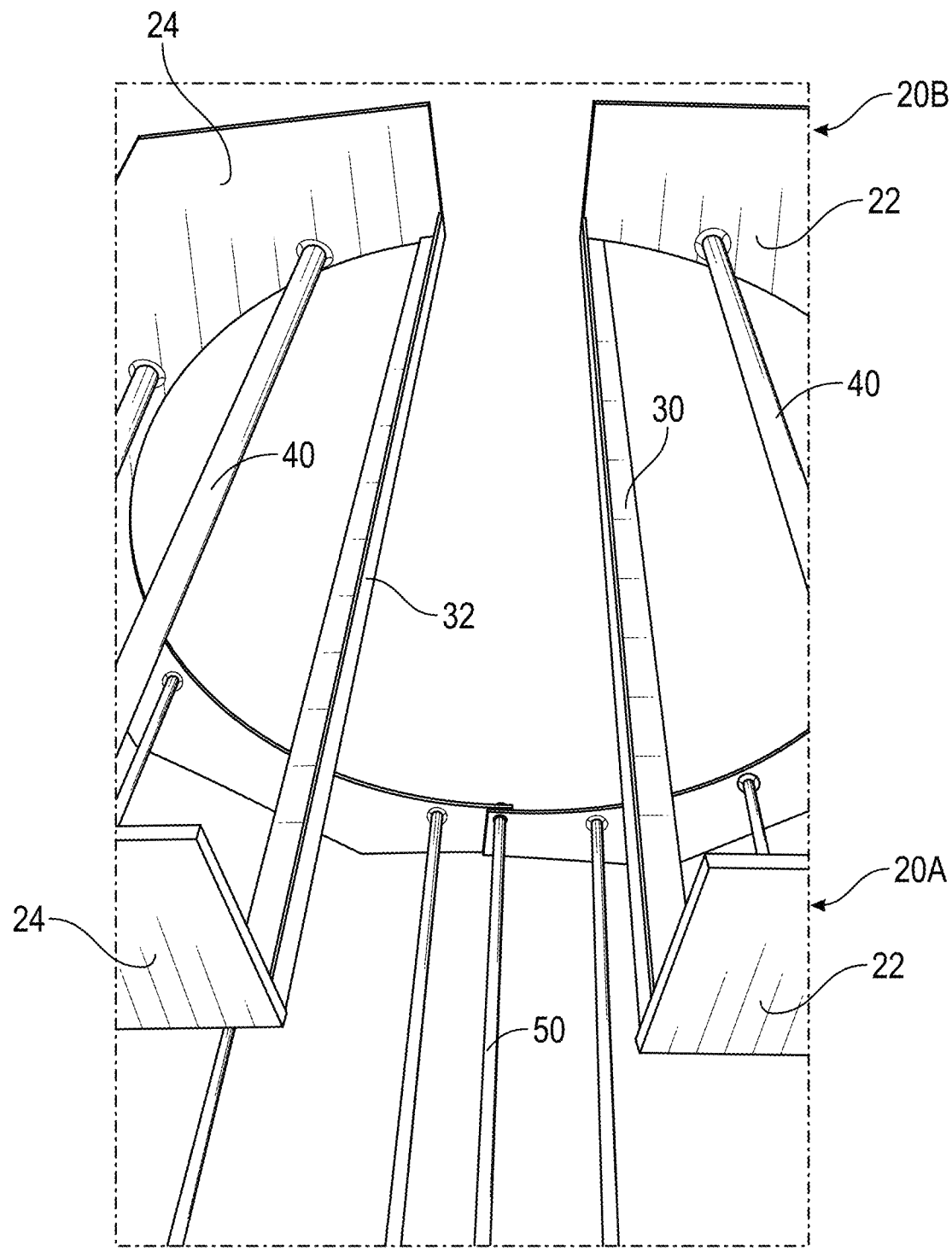
FIG. 6 illustrates a perspective view of a frame used in the device of FIG. 1.

As illustrated in FIG. 6, one or more additional structural and/or other support members 30, 32 can be included in a particular device design. In FIG. 6, opposing sections 22, 24 of the end members 20A, 20B can include one or more angles 30, 32 that are configured to align and meet when the device 10 is in a closed orientation. Such angles 30, 32 can assist a user to move the device 10 between the open and closed positions or orientations. For example, the angles 30, 32 can provide a meeting point for adjacent sections 22, 24 of the end members. In some embodiments, the sections 22, 24 can be secured to one another along the angles 30, 32 and/or other meeting locations, either in addition to or in lieu of the connections created by one or more latches, locks or other securement devices or features 28.

According to some embodiments, such additional structural and/or other support members 30, 32 can also assist with supporting (e.g., directly and/or indirectly) the area along the struts or other connecting members 40 that are designed to support the cable couplings 120. For instance, in some arrangements, one or more trays or other intermediate members can be positioned between the support members 30, 32 and the cable 100.

The systems, apparatuses, devices and/or other articles disclosed herein may be manufactured or otherwise formed through any suitable means. The various methods and techniques described above provide a number of ways to carry out the disclosed inventions. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the inventions disclosed herein.

The various systems, devices and/or related methods disclosed herein can be used to at least partially demagnetize piping systems prior to welding. However, the various embodiments disclosed herein can be applied to systems other than piping in order to at least partially reduce magnetic forces along one or more targeted items or areas. Accordingly, the various aspects of the inventions disclosed herein can be applied to many different contexts.

Although several embodiments and examples are disclosed herein, the present application extends beyond the specifically disclosed embodiments to other alternative embodiments and/or uses of the inventions and modifications and equivalents thereof. It is also contemplated that various combinations or subcombinations of the specific features and aspects of the embodiments may be made and still fall within the scope of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

While the embodiments disclosed herein are susceptible to various modifications, and alternative forms, specific examples thereof have been shown in the drawings and are herein described in detail. It should be understood, however, that the inventions are not to be limited to the particular forms or methods disclosed, but, to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers. For example, "about 10 mm" includes "10 mm." Terms or phrases preceded by a term such as "substantially" include the recited term or phrase. For example, "substantially parallel" includes "parallel."

What is claimed is:

1. A device for reducing magnetic force along a section of piping, the device comprising:
    a first end member comprising a central opening;
    a second end member comprising a central opening;
    at least one connecting member extending between the first end member and the second end member, the at least one connecting member secured to both the first and second end members;
    wherein the at least one connecting member defines a passageway that generally aligns with the central openings of the first and second end members; and wherein the passageway and the central openings of the first and second members are sized and otherwise configured to accommodate a pipe section; and a coil configured to conduct electrical current; wherein the coil is positioned in a helical arrangement around the passageway along the at least connecting member;

wherein the device is configured to be moved between a closed configuration and an open configuration, wherein in the closed configuration the coil is configured to surround piping, and wherein the device can be positioned over and removed from piping in the open configuration;

wherein the coil is configured to couple to an electrical energy source for selectively delivering electrical current to the coil; and wherein the coil comprises at least one coil coupling, the at least one coil coupling being configured to removably couple adjacent portions of the coil, wherein the at least one coil coupling permits the coil to remain secured to the at least one connecting member when the device is in the closed and open orientations.

2. The device of claim 1:

wherein each of the first and second end members comprises a first section and a second section, wherein the first section is configured to move relative to the second section in order to move the device between the closed and open configurations;

wherein the first and second sections are configured to move relative to the at least one movable connection point;

wherein each of the first and second end members comprises a polygonal shape; and wherein the coil comprises a first end and a second end, wherein the first and second ends of the coil are configured to be located adjacent the same end member.

3. The device of claim 1, wherein the first and second sections are configured to move relative to the at least one movable connection point.

4. The device of claim 3, wherein the at least one movable connection point comprises a hinge or a pivot.

5. The device of claim 3, wherein each of the first and second sections comprise half or substantially half of the corresponding end member.

6. The device of claim 1, wherein each of the first and second end members comprises a polygonal shape.

7. The device of claim 6, wherein the polygonal shape comprises an octagonal shape.

8. The device of claim 1, wherein each of the first and second end members comprises a round or circular shape.

9. The device of claim 1, wherein the at least one coil coupling comprises a first coil coupling and at least a second coil coupling, wherein the first coil coupling and the at least second coil coupling are configured radially align relative to a longitudinal axis of the passageway and the device.

10. The device of claim 1, wherein the coil comprises a first end and a second end, wherein the first and second ends of the coil are configured to be located adjacent the same end member.

11. A device for reducing magnetic force along a section of piping, the device comprising:

a first end member;

a second end member;

at least one connecting member extending between the first end member and the second end member, the at least one connecting member secured to both the first and second end members;

wherein a passageway extending through the first end member, the second member and the at least one connecting member is configured to accommodate a pipe section; and a coil configured to conduct electrical current; wherein the coil is positioned around the passageway along the at least connecting member;

wherein the device is configured to be moved between a closed configuration and an open configuration, wherein in the closed configuration the coil is configured to surround piping, and wherein the device can be positioned over and removed from piping in the open configuration;

wherein the coil is configured to couple to an electrical energy source for selectively delivering electrical current to the coil; and wherein the coil comprises at least one coil coupling, the at least one coil coupling configured to removably couple adjacent portions of the coil, wherein the at least one coil coupling permits the coil to remain secured to the at least one connecting member when the device is in the closed and open orientations.

12. The device of claim 11:

wherein each of the first and second end members comprises a first section and a second section, wherein the first section is configured to move relative to the second section in order to move the device between the closed and open configurations;

wherein the first and second sections are configured to move relative to the at least one movable connection point;

wherein each of the first and second end members comprises a polygonal shape; and wherein the coil comprises a first end and a second end, wherein the first and second ends of the coil are configured to be located adjacent the same end member.

13. The device of claim 11, wherein the first and second sections are configured to move relative to the at least one movable connection point.

14. The device of claim 13, wherein the at least one movable connection point comprises a hinge or a pivot.

15. The device of claim 13, wherein each of the first and second sections comprises half or substantially half of the corresponding end member.

16. The device of claim 11, wherein each of the first and second end members comprises a polygonal shape.

17. The device of claim 11, wherein the at least one coil coupling comprise a first coil coupling and at least a second coil coupling, wherein the first coil coupling and the at least second coil coupling are configured radially align relative to a longitudinal axis of the passageway and the device.

18. The device of claim 11, wherein the coil comprises a first end and a second end, wherein the first and second ends of the coil are configured to be located adjacent the same end member.

* * * * *